United States Patent [19]

Raney

[11] Patent Number: 5,788,802
[45] Date of Patent: Aug. 4, 1998

[54] VACUUM DRUM FEED AND ALIGNMENT APPARATUS FOR MULTIPLE LAYER LAMINATOR

[75] Inventor: Charles C. Raney, Lenexa, Kans.

[73] Assignee: Preco Industries, Inc., Lenexa, Kans.

[21] Appl. No.: 735,107

[22] Filed: Oct. 22, 1996

[51] Int. Cl.[6] ............................ B32B 31/00; G05G 15/00
[52] U.S. Cl. ...................... 156/351; 156/353; 156/361; 156/362; 156/363; 156/364; 156/513; 156/519; 156/520; 156/552
[58] Field of Search ........................... 156/351, 353, 156/361, 362, 363, 364, 513, 517, 518, 519, 520, 552, 556, 567, 568; 226/16, 32, 33, 34, 35; 271/226, 227, 228, 229, 261; 364/469.03, 469.04, 559

[56] References Cited

U.S. PATENT DOCUMENTS

| | | | |
|---|---|---|---|
| 3,713,948 | 1/1973 | Kluger | 156/351 |
| 3,861,983 | 1/1975 | Harrell | 156/361 |
| 3,915,780 | 10/1975 | Broussard, Jr. et al. | |
| 3,962,026 | 6/1976 | Lottridge | |
| 4,003,511 | 1/1977 | Schwestka | 226/3 |
| 4,109,158 | 8/1978 | Blitchington et al. | |
| 4,372,890 | 2/1983 | Oizumi et al. | |
| 4,536,239 | 8/1985 | Benson | |
| 4,607,961 | 8/1986 | Blitchington et al. | |
| 4,714,504 | 12/1987 | Cummings et al. | 156/351 X |
| 4,844,758 | 7/1989 | Hamamura et al. | 156/361 X |
| 4,888,717 | 12/1989 | Ditto et al. | 364/559 |
| 4,927,479 | 5/1990 | Bock | |
| 4,933,043 | 6/1990 | Instance | 156/364 X |
| 5,045,135 | 9/1991 | Meissner et al. | 156/351 X |
| 5,078,820 | 1/1992 | Hamamura et al. | |
| 5,087,313 | 2/1992 | Duecker | 156/351 X |
| 5,091,962 | 2/1992 | Malloy et al. | 226/16 X |
| 5,098,507 | 3/1992 | Mao | |
| 5,137,758 | 8/1992 | Kistner et al. | |
| 5,279,696 | 1/1994 | Zangenfeind et al. | 156/354 |

Primary Examiner—David A. Simmons
Assistant Examiner—Paul M. Rivard
Attorney, Agent, or Firm—Hovey, Williams, Timmons & Collins

[57] ABSTRACT

A laminator is provided for registering and laminating one or more web or sheet laminae on a web substrate, wherein each lamina has defined, successive areas and indicia provided in predetermined positions relative to the defined areas. The laminator includes feed rollers for feeding a web substrate through the laminator along a path of travel, and an additional feed mechanism for feeding a web or sheets to a drum forming a part of the laminator. The drum is shiftable toward and away from the web substrate between an engaged position in which the drum engages the substrate, and a disengaged position in which the drum is removed from contact with the substrate. A registration system successively registers the web or each sheet on the drum with the substrate, with the defined area of the web or sheet in a desired predetermined relationship to one of the defined areas of the substrate as successive defined areas are brought into a laminating position. The registration system includes a sensing mechanism for sensing the relative positions of the indicia on the web or sheet and the substrate, and a motor is provided for rotating the drum relative to the substrate in the disengaged position of the drum to adjust the relative positions of the web or sheet and the substrate so that each defined area of the web or sheet is in the desired predetermined relationship to one of the defined areas of the substrate. The drum is shifted to the engaged position and rotated when the web or sheet on the drum is registered with the substrate to laminate the web or sheet on the substrate.

20 Claims, 4 Drawing Sheets

FIG. 11.

VACUUM DRUM FEED AND ALIGNMENT APPARATUS FOR MULTIPLE LAYER LAMINATOR

BACKGROUND OF THE INVENTION

1. Field of the Invention

The present invention relates generally to laminators, and more particularly to a web-fed laminator for laminating one or more web or sheet laminae onto a web substrate in precise registration with one another.

2. Discussion of the Prior Art

It is conventional to laminate one or more sheet laminae onto a web substrate in precise registration with one another by providing a registration system including a plurality of pins that engage holes formed in the sheet and substrate. Typically, the web substrate and each sheet include defined areas formed thereon which must be registered with a defined area of the substrate. By providing holes in the web substrate and each sheet, proper registration is obtained manually by positioning the substrate and sheets onto the pins of the registration system.

Because this conventional laminating system is manual, it is both time-consuming and expensive. However, by providing sheet laminae, each defined area can be inspected prior to lamination in order to significantly reduce the number of laminated parts that are defective.

Another conventional laminator construction coordinates printing or punching of the defined areas on the web substrate with the positioning of defined areas on a single web lamina as the web lamina is fed toward a laminating position. The laminator includes a die press for successively punching defined areas into the web substrate, and a registration system for punching the defined areas in registration with the corresponding defined areas on the web lamina. Although such a construction operates faster than a manual laminator, it is not possible to reject defective areas of the substrate or web lamina prior to lamination. As a result, it is not possible to reject defective components until after lamination, increasing the cost of production. Further, although such a laminator has utility in laminating a pre-printed or pre-punched lamina web with a web substrate that is printed or punched during the laminating process, it is not possible to add a third lamina in the known construction or to register two or more preformed or preprinted webs with one another.

OBJECTS AND SUMMARY OF THE INVENTION

It is an object of the present invention to provide a laminator for laminating one or more web or sheet laminae onto a web substrate in precise registration with one another without requiring manual intervention in the registration or lamination process, and without limiting the number of laminae that can be layered in precise registration with one another.

It is another object of the present invention to provide a laminator in which at least one of the web lamina can be inspected prior to lamination and sheeted, when necessary, to remove and reject defective areas of the lamina.

Another object of the present invention is to provide a laminator in which longitudinal, lateral and angular registration of the defined areas of the laminae can be achieved prior to lamination.

In accordance with these and other objects evident from the following description of a preferred embodiment of the invention, a laminator is provided for laminating sheets onto a web substrate, wherein the web and sheets each have defined, successive areas with indicia provided in predetermined positions relative to the defined areas. The laminator includes a web feeding means for feeding the web substrate through the laminator along a path of travel, and a sheet feeding means for sequentially feeding sheets to a drum that is shiftable toward and away from the web substrate between an engaged position in which the drum engages the substrate, and a disengaged position in which the drum is removed from contact with the substrate. The drum defines a central axis extending in a direction generally transverse to the path of travel of the substrate, and includes a gripping means for gripping each sheet as the sheet is fed to the drum.

The laminator also includes a registration means for successively registering the defined area of each sheet on the drum with one of the areas on the substrate as the web and successive sheets are brought into a laminating position. The registration means includes a sensing means for sensing the presence of the indicia on the sheet and the substrate at a fixed distance from the laminating position, and a rotating means for rotating the drum relative to the substrate in the disengaged position of the drum to adjust the position of the sheet relative to the substrate so that each defined area of the sheet is in the desired predetermined relationship to one of the defined areas of the substrate. A shifting means is provided for shifting the drum to an engaged position in contact with the web when the sheet on the drum is registered with the substrate and to a disengaged position after the sheet has been laminated on the substrate. The rotating means rotates the drum in the engaged position to laminate the sheet on the substrate with each defined area of the sheet in the desired predetermined relationship to one of the defined areas of the substrate.

By providing a laminator in accordance with the present invention, numerous advantages are realized. For example, by providing a laminator having a shiftable drum and a means for successively registering each sheet on the drum with a web substrate, it is possible to automatically register each layer of a laminate with the remainder of the layers without requiring the use of registration pins or manual assistance. In addition, the automated process allows for the rejection of defective sheets prior to lamination, increasing the number of satisfactory parts and reducing the production costs.

It is also possible to provide an angular adjustment means for turning the drum relative to the substrate about a turning axis extending in a direction perpendicular to both the central axis of the drum and the path of travel of the substrate to adjust the relative angular positions of the sheet and the substrate so that each defined area of the sheet is in a desired predetermined angular relationship to one of the defined areas of the substrate. Thus, longitudinal, lateral and angular registration can be automatically achieved with a high degree of precision.

BRIEF DESCRIPTION OF THE DRAWING FIGURES

The preferred embodiment of the present invention is described in detail below with reference to the attached drawing figures, wherein.

DETAILED DESCRIPTION OF THE PREFERRED EMBODIMENT

Figure 1:
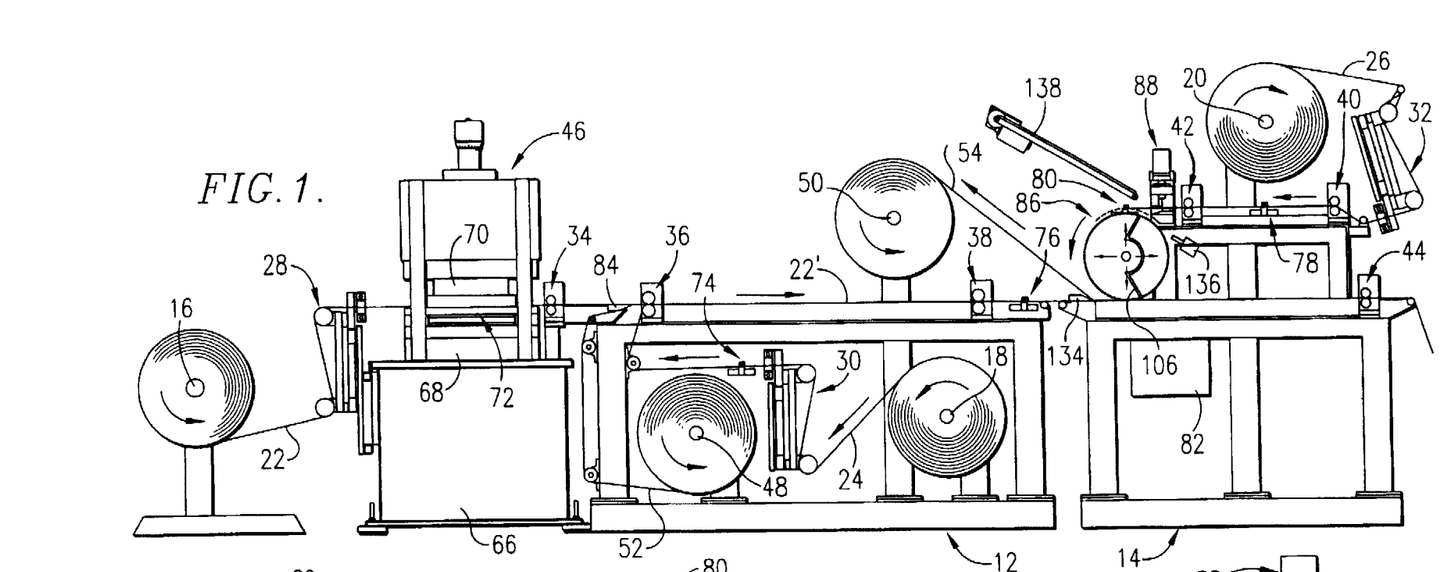
FIG. 1 is a schematic side elevational view of a laminator constructed in accordance with the preferred embodiment.

A laminator constructed in accordance with the preferred embodiment is illustrated in FIG. 1, and generally includes a pair of frames 12, 14, three supply stands 16, 18, 20 for supporting three webs 22, 24, 26 that are to be laminated together, three lateral web guide assemblies 28, 30, 32, each associated with one of the supply stands, and six pairs of pinch rollers 34, 36, 38, 40, 42, 44 for feeding the webs through the laminator. A die press 46 is positioned between the supply stand 16 and the support structure 12 for punching defined areas into the web 22 prior to lamination of the web with the lower web 24. A first registration system is provided for coordinating printing or punching of the defined areas in the web 22 with the positioning of defined areas on the lower web 24 as the webs 22, 24 are fed toward a laminating position defined by the pinch rollers 36. A second registration system is also provided for registering the upper web 26 with the substrate 22.

The frame 12 supports the supply stand 18, a pair of rewind stands 48, 50, the lateral web guide assembly 30, two of the pairs of pinch rollers 36, 38, and portions of the first and second registration systems. The frame 14 supports the supply stand 20, the lateral web guide assembly 32, three of the pairs of pinch rollers 40, 42, 44, and portions of the second registration system.

The support stand 16 is preferably free-standing, and is spaced from the frame 12 by a distance sufficient to permit placement of the die press 46 therebetween. In an exemplary embodiment, the web 22 supported on the stand 16 is formed of a transparent, non-conductive material such as Mylar or the like, and defines a substrate on which the lower and upper webs 24, 26 are adhered during lamination. The web 22 includes the substrate itself, which is coated on both sides with an adhesive, and lower and upper release liners 52, 54. The release liners are formed of kraft paper or other suitable material, and protect the adhesive so that the web can be uncoiled without sticking to itself, and the liners can be removed from the substrate in a manner described below in order to expose the surfaces of the substrate for lamination.

Figure 9:
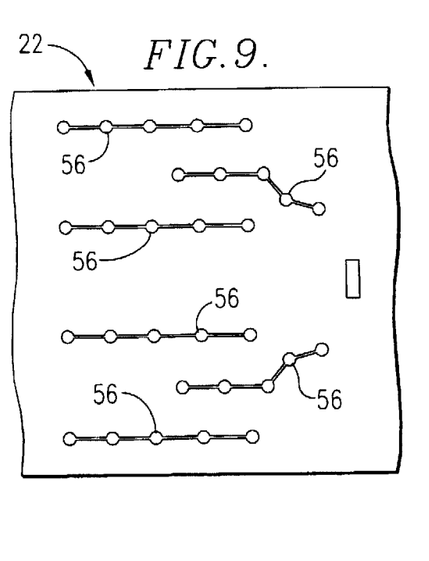
FIG. 9 is a fragmentary top plan view of a second of the webs.

The web 22 is initially blank, and defined, successive areas are punched in the web as the web is fed through the die press 46. In an exemplary embodiment, as shown in FIG. 9, each defined area includes a plurality of cutouts 56, some of which take the form of a series of circular openings that are connected together by a common slit.

Figure 8:
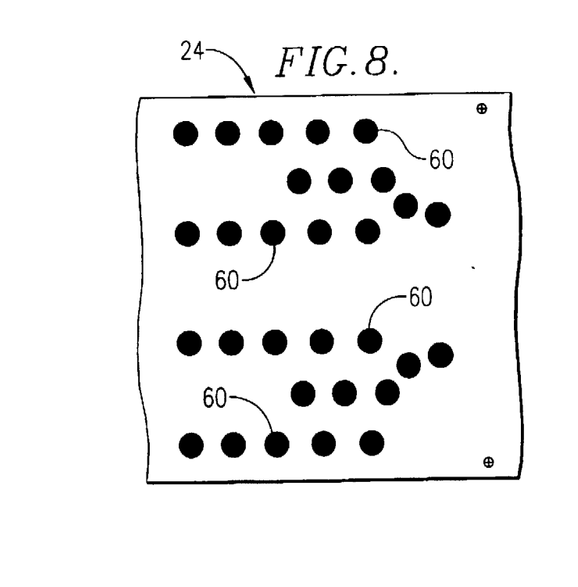
FIG. 8 is a fragmentary top plan view of one of the webs.

Returning to FIG. 1, the lower and upper webs 24, 26 are supported on the stands 18, 20, and are also both formed of a transparent, non-conductive material such as Mylar or the like. In an exemplary embodiment, shown in FIG. 8, the lower web 24 includes a plurality of defined, successive areas printed on the upper surface thereof, and a pair of indicia 58 provided in predetermined positions relative to each defined area. Each defined area includes a plurality of circular spots 60, each formed of an electrically conductive material, wherein the spots are positioned within each defined area at locations corresponding to the locations of the circular openings in the cutouts 56 of the web 22.

Figure 10:
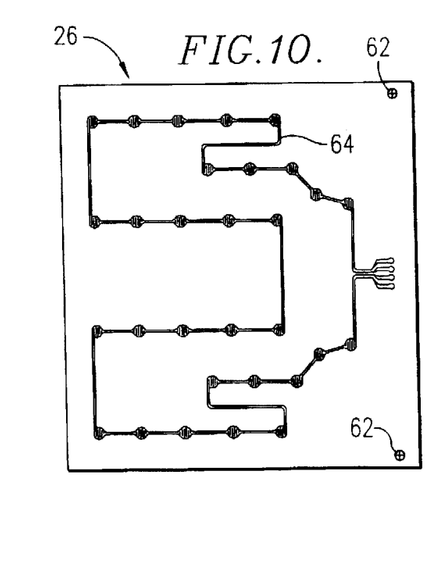
FIG. 10 is a fragmentary top plan view of a third of the webs.

An exemplary embodiment of the upper web 26 is illustrated in FIG. 10, and includes a plurality of defined, successive areas, and a pair of indicia 62 provided in predetermined positions relative to each defined area. Each defined area is printed on the underside of the web and includes a printed circuit 64 formed of an electrically conductive material, wherein gaps in the circuit are positioned within each defined area at locations corresponding to the locations of the circular openings in the cutouts 56 of the web 22.

Figure 7:
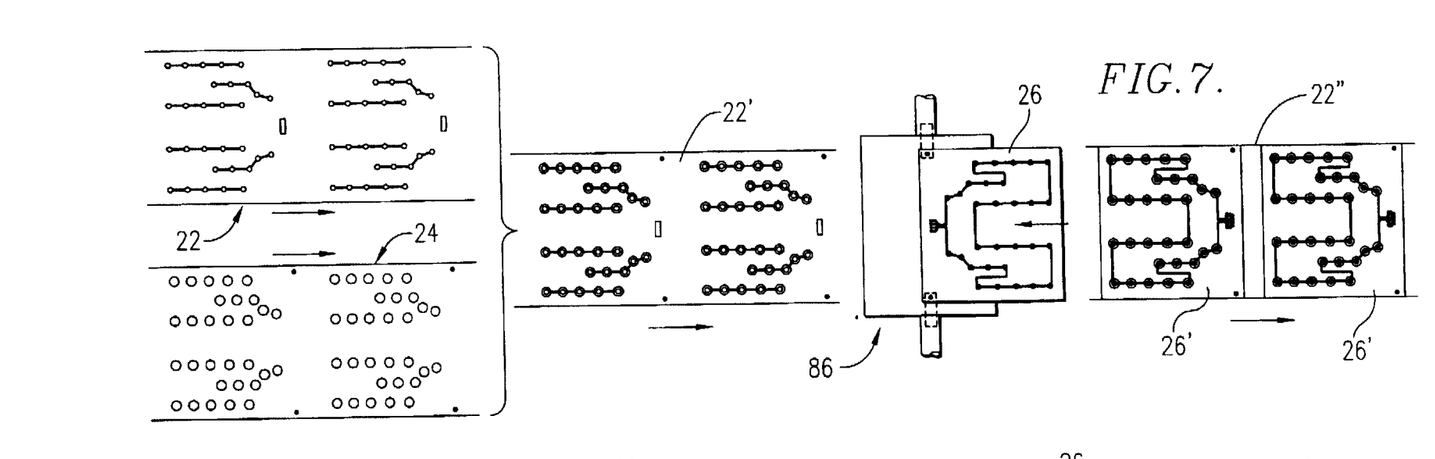
FIG. 7 is a schematic layout illustrating three webs at various stages of lamination.

When respective defined areas of the webs 22, 24, 26 of the exemplary embodiment are brought together in a laminate 22", as shown in FIG. 7, the intermediate substrate 22 separates the electrically conductive material on the lower web 24 from the electrically conductive material on the upper web 26, preventing the webs 24, 26 from contacting one another and closing the gaps in the circuit of the upper web. However, the presence of the circular openings in the substrate 22 permits such physical closure of the gaps in the circuit when the three-layered laminate 22" is compressed in the areas of the openings. Such closure varies the current through the circuit, providing an output representative of the number of gap closures that have been made.

Again returning to FIG. 1, the lateral support guide 28 is mounted on the upstream side of the die press 46, and the web 22 is trained through the guide and directed into the press. The guide 28 includes a pair of rollers that are spaced from one another along the path of travel of the web, and a means for adjusting the orientation of the rollers to maintain a desired lateral registration of the web that can be set prior to or during operation of the laminator. The other lateral support guides 30, 32 are identical to the guide 28, and function to maintain a desired lateral registration of the webs 24, 26. All three guides can be coordinated prior to or during operation of the laminator so that the three webs remain in lateral registration with one another.

The die press 46 is conventional and an exemplary embodiment thereof is disclosed in U.S. Pat. No. 4,555,968 (hereinafter the '968 patent), the disclosure of which is incorporated herein by this express reference. The press includes an independent frame 66 supported adjacent the upstream end of the frame 12, a base platen 68 defining a work station, and a power operated ram platen 70 shiftable toward and away from the base platen. A space is provided between the base and ram platens for receipt of a die unit 72 having cooperative upper and lower components that are brought together during operation of the press to punch the defined areas in the web.

The base platen 68 of the die press includes a movable bolster on which the die unit is supported, and a registration mechanism for rotating the bolster about a vertical axis to adjust the angular orientation of the die unit relative to the web. In addition, the registration mechanism can shift the bolster laterally relative to the path of travel of the web. Thus, the die press provides a means for adjusting the lateral and angular positioning of each defined area on the web.

The first registration system is employed for controlling the placement of the defined areas on the web 22, and broadly includes the die press 46 itself, a sensor 74 located along the travel path of the lower web 24, and a controller 82 for controlling the die press in response to signals received from the sensor. The sensor 74 is conventional, and includes a flat horizontal lower face in proximal relationship to the lower web, and at least one fiber optic bundle, the end of which protrudes through the face and is directed toward the web. Light-transmitting glass fibers make up the bundle, and certain of the fibers act as light transmitters while others function as receptors. Phototransistors receive light from the receptor fibers to provide an output signal indicative of the presence or absence of an indicia at a predetermined location relative to the bundle.

The controller 82 is a programmable logic controller (PLC), although it is also possible to employ a computer or any other conventional controller. Preferably, the controller is connected to the sensor 74 for receiving the output signals therefrom, and controls operation of the pinch roller pairs 34, 36, 38 and the die press 46 among other components as described below.

A peel-back station is provided at the upstream end of the frame 12 between the pinch roller pairs 34, 36, and presents a peel-back bar 84, a plurality of guide rollers, and the rewind stand 48. The lower release liner 52 is peeled from the bottom surface of the web 22 at the peel-back station and is directed onto a rewind roll supported on the stand 48. Such peel-back of the lower release liner exposes the adhesive on the underside of the web 22 so that when the webs 22, 24 are brought together by the pinch roller pair 36, the lower web 24 is adhered to the substrate to form a two-layered laminate 22' as shown in FIG. 7.

The second registration system is shown in FIG. 1, and registers the upper web 26 with the laminate formed by the webs 22, 24. The registration system broadly includes a drum assembly 86 for bringing the third web into contact with the laminate, a sheeter 88 for cutting the web into sheets, three sensors 76, 78, 80, and the controller 82, which controls the pinch rollers 34, 36, 38, 40, 42, 44, the drum assembly 86 and sheeter 88 in response to the sensors 76, 78, 80.

Figure 3:
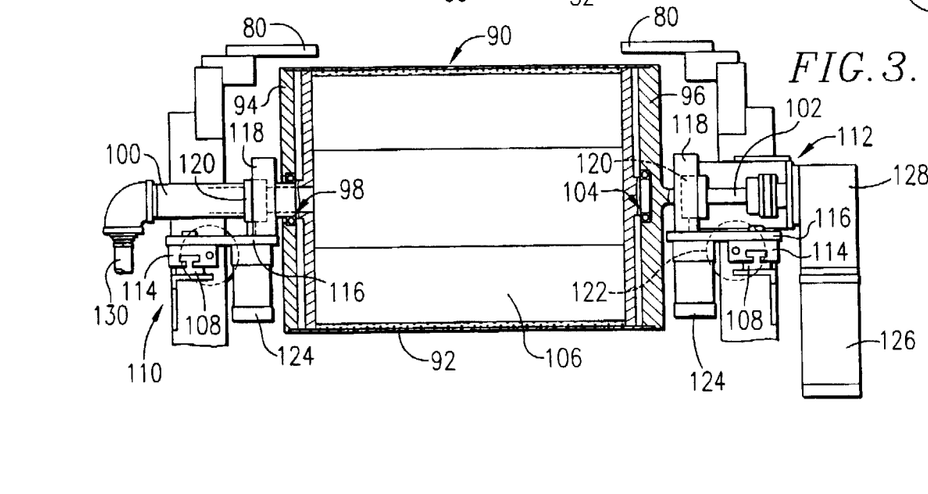
FIG. 3 is a sectional view taken along line 3—3 of FIG. 2.

The drum assembly is shown in FIG. 3, and broadly includes a cylindrical drum 90, a support means for supporting the drum for movement in various directions relative to the frame, means for carrying out such movement of the drum, and a gripping means for gripping the web or sheets formed from the web as they are fed onto the drum.

The drum 90 includes a tubular outer wall 92 and a pair of circular, laterally opposed end walls 94, 96 that close, ends of the outer wall to define a hollow interior. The end wall 94 includes a central opening aligned with the central longitudinal axis of the drum, and a bearing assembly 98 is provided within the opening for supporting the end wall for relative rotation on a conduit 100. The other end wall 96 includes an axially extending shaft 102 by which the drum is supported and moved in a manner described more fully below. The end wall 96 includes an interior recess aligned with the opening, and a bearing assembly 104 is provided within the recess for supporting an end shaft of a baffle 106 supported within the drum. The baffle is secured to the conduit so that it remains fixed in place during rotation of the drum, and divides the interior of the drum into two circumferential regions that are substantially isolated from one another.

Figures 4, 5, 6:
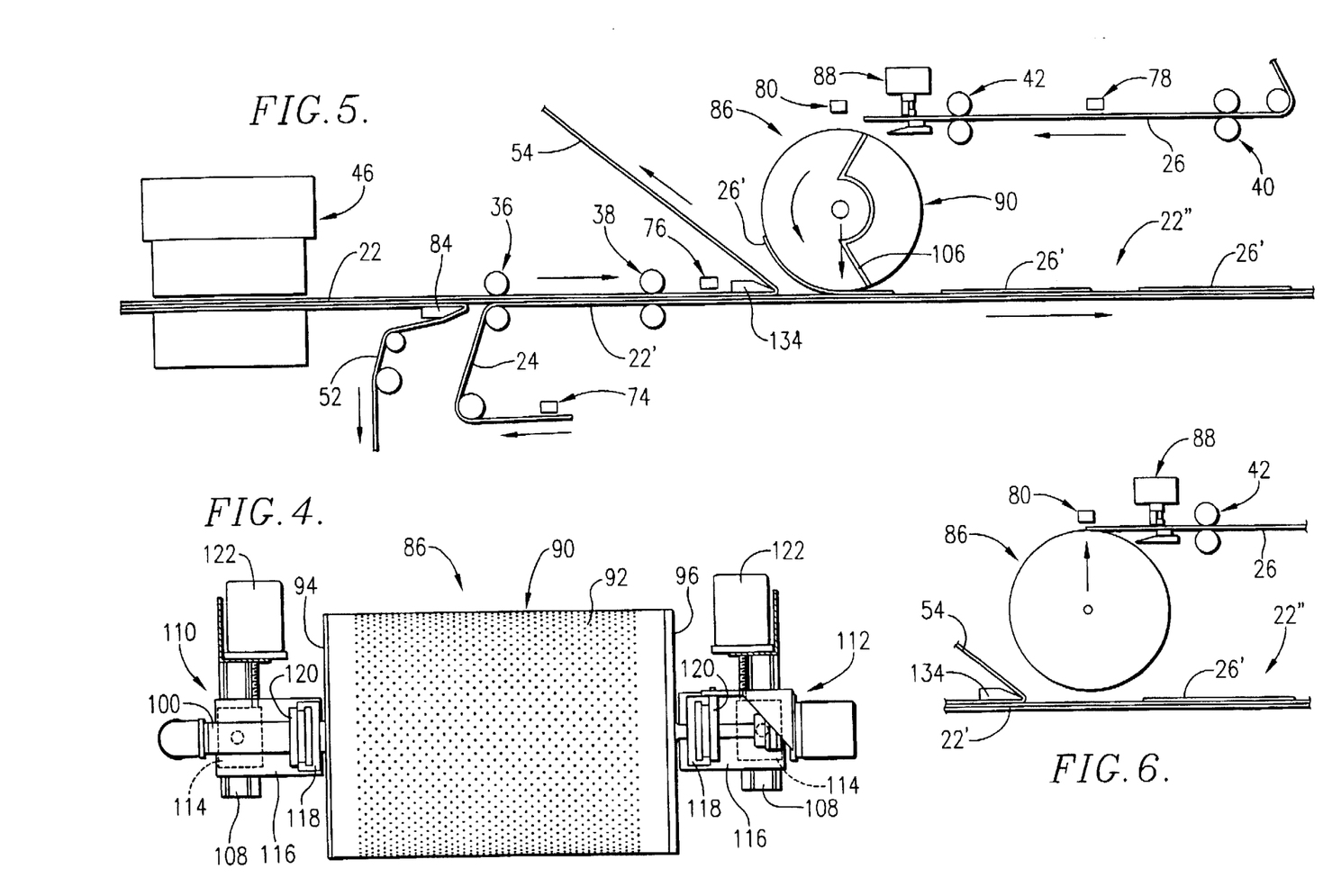
FIG. 4 is a top plan view of the drum assembly.
FIG. 5 is a schematic side elevational view of the laminator, illustrating the travel paths of various webs and laminator components during operation.
FIG. 6 is a fragmentary schematic view of the drum assembly.

The support means of the drum assembly 86 includes a pair of parallel, longitudinally extending, laterally spaced rails 108 that are fixed to the frame 14, and a pair of carriages 110, 112 that are supported on the rails for relative longitudinal shifting movement. Each carriage includes a shuttle 114 that is received on the rail for guiding movement of the carriage relative to the rail. A base plate 116 is secured to the top of each shuttle 114, and an upstanding arm 118 is supported on the base plate adjacent one of the end walls of the drum. As shown in FIG. 4, each arm 118 presents a vertically extending channel within which a block 120 is received for relative vertical shifting movement, the channel being stepped to retain the block on the arm and guide such vertical shifting movement. The conduit 100 extends through and is fixed to the block of the carriage 110 so that when the block is shifted vertically relative to the arm 118, the conduit is also lifted, shifting the drum vertically. At the opposite end of the drum, as shown in FIG. 3, the shaft 102 extends through the block 120 of the carriage 112 and is supported by a suitable bearing assembly so that when the block is shifted vertically on the arm, the shaft is also lifted, shifting the drum while permitting rotation thereof.

As shown in FIG. 4, a pair of linear actuators 122 are supported on the frame 14 and connected to the shuttles 114 for shifting the carriages 110, 112 along the rails 108. Each actuator can be operated independently of the other so that each end of the drum can be shifted longitudinally relative to the other to turn the drum relative to the laminate about a vertical turning axis that is perpendicular to both the central longitudinal axis of the drum and the path of travel of the laminate. By providing such a turning means, it is possible to adjust the relative angular position of a sheet supported on the drum relative to the laminate so that each defined area of such sheet is in a desired predetermined angular relationship to one of the defined areas of the laminate.

Figure 2:
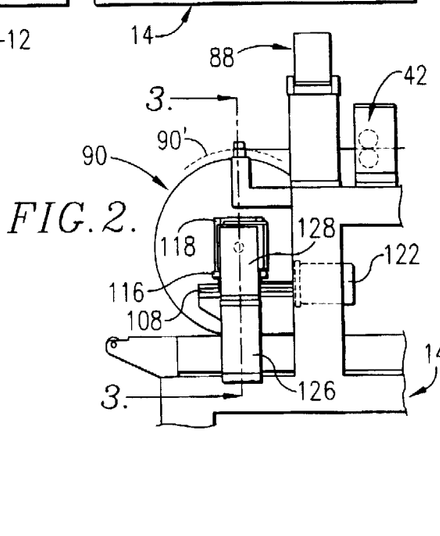
FIG. 2 is a fragmentary side elevational view of cylindrical drum assembly forming a part of the laminator.

Returning to FIG. 3, a pneumatic linear actuator 124 is supported on the base plate of each carriage 110, 112 for shifting the blocks 120 up and down within the channels of the arms. Each actuator 124 includes an output shaft that extends through the base plate and engages the block for carrying out such lifting and lowering movement. Such a construction defines a shifting means for shifting the drum 90 relative to the travel path of the laminate between an engaged position, shown in solid lines in FIG. 2, in which the drum 90 engages the substrate 22', and a disengaged position designated by the dashed line 90', in which the drum is removed from contact with the substrate.

A motor 126 is supported on the base plate of the carriage 112 for rotating the drum, and includes an output shaft that is connected to the shaft 102 through conventional gearing that is housed in a gearbox 128. Thus, the motor defines a rotating means that can be operated independently of the pinch rollers to adjust the rotational position of the drum relative to the laminate in the disengaged position of the drum. Likewise, the motor drives rotation of the drum in the engaged position to bring a sheet on the drum into contact with the laminate.

The gripping means of the drum assembly includes a vacuum system for drawing a vacuum through a plurality of minute openings in the tubular wall of the drum so that a sheet conveyed onto the drum is drawn against the wall and held in place. The openings in the wall communicate with the interior of the drum which, in turn, is in communication with the conduit 100. A flexible vacuum line 130 is connected to the conduit for communicating the drum with a conventional source of vacuum pressure. The flexible line accommodates vertical shifting movement of the conduit 100 and the drum 90 while applying a vacuum to the interior of the drum. As mentioned, the baffle 106 divides the interior into a pair of circumferential sections, one of which communicates with the conduit 100 and the other of which is isolated therefrom, as shown in FIG. 1. As such, a vacuum is drawn through the openings in the tubular wall only during rotation of the openings along the circumferential section exposed to the vacuum, and vacuum pressure is relieved from the openings as they rotate along the opposing circumferential section. By providing this construction, sheets fed to the drum are gripped during lamination, and are released immediately after lamination to prevent them from being pulled back away from the laminate.

The supply stand 20 is supported on the frame 14 above the drum assembly 86, and the upper web 26 is supported on the stand and is guided through the lateral web guide assembly 32, between the two pairs of pinch rollers 40, 42 and onto the drum 90. The sheeter 88 is supported on the frame 14 along the travel path of the upper web, and is disposed between the pinch roller pair 42 and the drum. The construction of the sheeter is conventional, including a cutting blade that is vertically shiftable into and out of the travel path of the web for severing the web into sheets 132, shown in FIG. 5.

Returning to FIG. 1, the sensor 78 is supported on the frame 14 between the pinch roller pairs 40, 42 at a fixed distance from the sheeter. As described below, the sensor 78 senses the presence of one of the indicia on the upper web so that the web is properly positioned prior to operation of the sheeter. The sensor 76 is supported on the frame 12 at a position downstream of the pinch rollers 38 along the path of travel of the laminate. The sensor 76 is located a fixed distance from the laminating position defined by the line of contact between the drum 90 and the path of travel of the laminate 22'. As described below, the sensor 76 senses the presence of one of the indicia on the lower web 24 so that the laminate 22' is properly positioned prior to lamination with the upper web 26.

As shown in FIG. 3, the sensor 80 is supported on an upstanding arm of the frame 14 at a position overlying the drum 90, and is located a fixed distance from the laminating position along the path of travel of the upper web or sheet carried by the drum. Preferably, the sensors 76, 80 are located an equal distance from the laminating position so that each detects the indicia of a defined area next to be laminated so that proper registration of the upper web or sheet relative to the laminate can be achieved.

The three sensors 76, 78, 80 are preferably identical in construction to the sensor 74 described above, and each provides an output signal indicative of the presence or absence of an indicium at a predetermined location relative to the sensor. The number of sensors provided at each sensor location, and the number of fiber bundles included in each sensor, can be chosen in each construction to provide the accuracy and control necessary for that construction.

The controller 82 is responsive to the output signals of the three sensors 76, 78, 80, and controls operation of the pinch roller pairs, the sheeter 88, the actuators 122, 124, shown in FIGS. 3 and 4, and the motor 126 to register the upper web 26 or sheet 26' with the laminate and to bring the upper web or sheet into contact with the laminate.

A peel-back station is provided at the upstream end of the frame 14 adjacent the drum assembly, and presents a peel-back bar 134 and the rewind stand 50. The upper release liner 54 is peeled from the top surface of the web 22 at the peel-back station and is directed onto a rewind roll supported on the stand 50. Such peel-back of the upper release liner exposes the adhesive on the upper side of the web 22 so that when the upper web is brought into contact with the laminate by the drum, the upper web is adhered to the laminate.

During operation, as shown in FIG. 5, the controller drives the pinch roller pairs 34, 36, 38, 44 to unwind the webs 22, 24 from the stands 16, 18 and draw the webs toward the first laminating station defined by the pinch roller pair 36. The pinch rollers are operated in a stepwise fashion through a given increment of travel in order to bring the next successive defined area on the lower web 24 into proximity with the sensor 74. Thereafter, the pinch roller pairs are operated in a creep mode, incrementally advancing the webs until the sensor 74 first detects a segment of one of the indicia associated with the web 24. Light transmitted to the surface of the web 24 by the fiber bundle is reflected from the surface and picked up by the receptor fibers, providing an output signal to the controller. When the output signal of the sensor indicates the presence of an indicium, the controller interrupts feed of the webs 22, 24, and actuates the die press to carry out a punching operation on the web 22 to form the defined area therein in register with the defined area on the lower web 24.

Upon completion of the punching operation, the controller advances the webs 22, 24 and the lower release liner 52 is peeled back from the substrate and wound on the rewind stand 48, exposing the adhesive on the underside of the substrate. As movement of the webs continues, they are brought together between the pinch rollers 36 such that the lower web is adhered to the underside of the substrate, forming the laminate, shown in FIG. 7.

Returning to FIG. 5, the controller operates the pinch roller pairs to feed the laminate 22' to the second laminating position defined by the drum 90 at which the upper web 26 is applied to the substrate. The controller also advances the upper web 26 by operating the pinch roller pairs 40, 42. Preferably, the upper pinch roller pairs are operated in a stepwise fashion through a given increment of travel in order to bring the next successive defined area on the upper web into proximity with the sensor 78. Thereafter, the pinch roller pairs 40, 42 are operated in a creep mode, incrementally advancing the web until the sensor 78 first detects a segment of one of the indicia associated with one of the defined areas. When an indicium is detected, the controller interrupts feed of the web 26 and actuates the sheeter 88 to sever the web. In this fashion, the web is cut into sheets 26', each bearing one of the defined areas and at least one indicium associated therewith.

The sheet 26' that is formed by operation of the sheeter extends onto the drum 90 and is retained on the drum by the vacuum pressure applied through the openings in the drum. The sheet is registered by operating the motor 126 of the drum assembly 86 in a creep mode, incrementally rotating the drum until the sensor first detects a segment of the indicium provided on the sheet. When the indicium is detected, the controller interrupts rotation of the drum. The laminate is registered by operating the pinch roller pairs 34, 36, 38, 44 in a stepwise fashion to advance the laminate 22' through a given increment of travel in order to bring the next successive defined area on the laminate into proximity with the sensor 76. Thereafter, the pinch roller pairs are operated in a creep mode, incrementally advancing the laminate until the sensor 76 first detects a segment of one of the indicia associated with one of the defined areas. When an indicium is detected, the controller interrupts feed of the laminate. Once the sheet 26' and laminate 22' are both properly registered relative to the sensors 76, 80, the drum 90 is lowered into the engaged position in contact with the laminate and rotated to feed the sheet onto the laminate at the same time that the laminate is advanced by the pinch roller pairs 34, 36, 38, 44. Thus, the sheet is laminated on the substrate with the defined area of the sheet in the desired predetermined relationship to one of the defined areas of the laminate.

Upon completion of each lamination, the actuators 124, shown in FIG. 3, are operated to shift the drum to the disengaged position so that the next successive sheet cut from the upper web can be registered relative to the substrate. As shown in FIG. 5, the sheet last applied to the laminate remains adhered to the upper surface thereof and is prevented from remaining secured to the drum by the baffle 106 which interrupts the vacuum pressure from being drawn through the openings in the drum as the openings rotate past the point at which the sheet is applied to the laminate. Once the drum is lifted to the disengaged position, the upper web 26 is then advanced to bring the next successive defined area into proximity with the sensor 80 on the drum, and the process is repeated.

As shown in FIG. 1, it is possible to provide a mechanism on the frame for ejecting portions of the web 26 bearing defined areas previously determined to be defective. Such a mechanism includes air nozzles 136 supported on the frame 14 and disposed beneath the sheeter 88 for directing a blast of air up between the drum 90 and the sheeter, and a conveyor 138 supported on the frame 14 above the drum assembly. In use, the controller 82 keeps track of the defined areas on the upper web during lamination, and when a previously determined defective area is advanced into registration with the sensor 78, the sheeter is operated and the web is advanced while the nozzles direct a blast of air onto the underside of the web. The blast of air lifts the front end of the web over the drum assembly and onto the conveyor 138 so that the conveyor can transport the defective portion of the web from the laminator. As the next successive defined area is detected by the sensor, the sheeter is operated to sever the defective sheet from the web, and the next defined area is conveyed onto the drum for registration and lamination.

If, during feed of the upper web 26, the controller 82 determines that the next successive defined area to be laminated is in register with the laminate without requiring adjustment of the drum, it is possible to forego operation of the sheeter and lower the drum to laminate the web onto the substrate. Thereafter, the drum is again shifted to the disengaged position and a determination is made as to whether the next successive area requires adjustment of the drum. If not, lamination continues as a web-on-web process. Thus, sheeting of the web is only required when it is necessary to adjust the registration of the next successive defined area on the upper web to be laminated relative to the position of the web 26 as maintained by the pinch roller pairs 40, 42.

Although the preferred embodiment illustrates the use of a laminator for applying upper and lower web layers to an intermediate substrate, it is possible to employ additional lamination steps without departing from the scope of the present invention. For example, successive laminating stations could be provided downstream of the frame 14, of similar construction, wherein each station includes a registration system for registering subsequent webs with the laminate. In addition, the webs can be formed of any desired material, and the defined areas on the various layers can be applied in any conventional manner, such as by silk screen printing, flexographic printing, punching or the like.

In addition to providing longitudinal registration of the defined areas on the various layers of the laminate, it is also possible to provide angular registration of the areas. An example of a system which provides such registration differs from the preferred embodiment described above in several respects, and is illustrated schematically in FIG. 11. In this alternate embodiment, it is preferred that a pair of indicia be provided in association with each defined area of each web in order to improve the accuracy with which the registration systems are able to sense the angular orientation of each defined area. However, it is possible to determine the angular orientation of a defined area by sensing the orientation of a single indicium.

Figure 11:
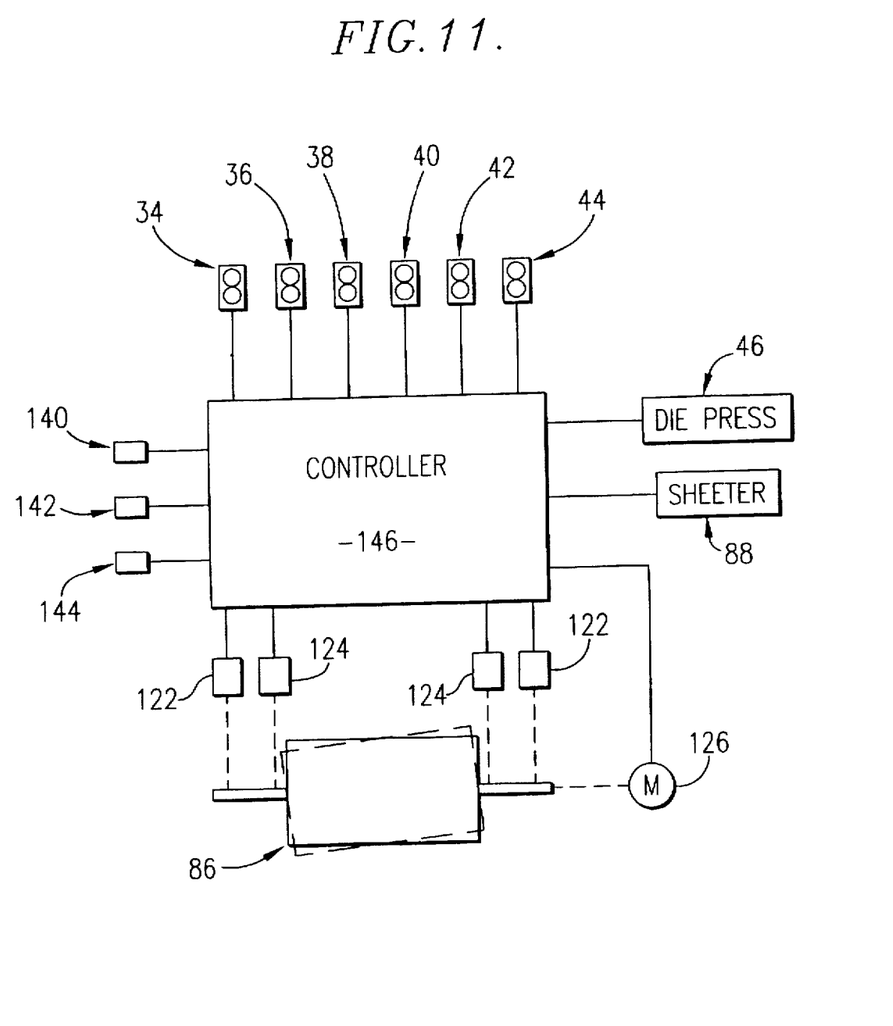
FIG. 11 is a schematic view of a laminator constructed in accordance with another aspect of the invention.

Preferably, camera pairs 140, 142, 144 are provided in place of the sensors 74, 76, 80, and each camera receives images that are used by the first and second registration systems. A lens system is provided in association with each camera for focusing the camera on a fixed location along the path of travel of the webs. A controller 146 is used with this type of "vision" system that is more complex than the PLC employed in the previously described embodiment, and preferably includes a conventional computer having a central processing unit, an input keyboard, and a monitor. Other than the foregoing differences, the alternate embodiment of the laminator is structurally similar to the preferred embodiment described above, and common reference numerals are used to refer to common elements.

During operation of the alternate embodiment, the controller drives the pinch roller pairs to unwind the webs 22, 24 from the stands and draw the webs toward the first laminating station as shown in the embodiment of FIG. 1. The pinch rollers are operated in a stepwise fashion through a given increment of travel in order to bring the next successive defined area on the lower web into proximity with the camera pair. Thereafter, advancement of the webs is interrupted while an image is obtained by the camera pair 140. These images are compared with reference image data stored in the controller and representative of a home position of the indicia, and longitudinal and angular difference data is generated that is representative of the difference in position between the detected locations of the indicia on the lower web and the home positions thereof. The controller 146 then operates the longitudinal and angular registration mechanisms of the die press 46 to adjust the longitudinal position and angular orientation of the die unit to correspond with the position and orientation of the sensed defined area on the lower web. Once such registration is obtained, the die press is actuated to form a defined area in the substrate 22 that, when brought together with the defined area on the lower web at the first laminating position, is in proper registration.

The controller 146 operates the pinch roller pairs to feed the laminate 22' to the second laminating position along the path shown in FIG. 7, at which the upper web 26 is applied to the substrate 22. The controller also advances the upper web 26 by operating the pinch roller pairs 40, 42. The upper pinch roller pairs are operated in a stepwise fashion through a given increment of travel in order to bring the next successive defined area on the upper web into proximity with the sensor 78, and thereafter advance the web in a creep mode until an indicium is detected by the sensor 78. Operation of the sheeter 88 is carried out in the same manner as in the embodiment described above, forming a sheet 26' that extends onto the drum 90. The indicia on the sheet are in proximity with the camera pair 144, and the sheet remains stationary as images are captured by the cameras 144 so that these images can be compared with reference image data stored in the controller and representative of home positions of the indicia, and longitudinal and angular difference data is generated that is representative of the difference in position between the detected locations of the indicia on the upper web and the home positions thereof. The controller 146 then operates the motor 126 and the actuators 122 of the drum assembly to bring the indicia to the home position so that the defined area is registered with the next successive defined area of the laminate.

If desired, the reference image data can be generated by the camera pair 142 positioned at the location of the sensor 76 that receive images of the locations of the indicia associated with the next successive defined area of the laminate. Thus, when a comparison is made between the images received by the camera pair 144 and the images received by the camera pair 142, it is possible to obtain registration of the next defined area on the upper web 26 with the next area on the laminate. Once registration is obtained, operation of the laminator proceeds in the same manner described above.

An example of a die press and registration system employing a registration system having cameras and a controller of the type described herein is disclosed in U.S. Pat. No. 5,212,647, which is incorporated herein by this express reference.

Although the present invention has been described with reference to the preferred embodiment, it is noted that equivalents may be employed and substitution made herein without departing from the scope of the invention as recited in the claims.

What is claimed is:

1. A laminator for laminating sheets onto a web substrate, wherein the web substrate and sheets each have defined, successive areas and indicia provided in predetermined positions relative to the defined areas, the laminator comprising:

a web feeding means for feeding the web substrate through the laminator along a path of travel;

a cylindrical drum shiftable toward and away from the web substrate between an engaged position in which the drum engages the web substrate, and a disengaged position in which the drum is removed from contact with the web substrate, the drum defining a central axis extending in a direction generally transverse to the path of travel of the web substrate;

a feeding means for sequentially feeding sheets to the drum, the drum including a gripping means for gripping each sheet as the sheet is fed to the drum;

a registration means for successively registering the defined area of each sheet on the drum in a desired predetermined relationship to one of the defined areas of the web substrate as successive defined areas are brought into a laminating position, the registration means including a sensing means for sensing the relative positions of the indicia on the sheet and the indicia on the web substrate, and a rotating means for rotating the drum relative to the web substrate in the disengaged position of the drum to adjust the relative positions of the sheet on the drum and the web substrate so that the defined area of the sheet on the drum is in the desired predetermined relationship to one of the defined areas of the web substrate;

a shifting means for shifting the drum between the engaged and disengaged positions, the shifting means shifting the drum to the engaged position when the sheet on the drum is registered with the web substrate and to the disengaged position after the sheet on the drum has been laminated on the web substrate, the rotating means rotating the drum in the engaged position to press the sheet on the drum against the web substrate with the defined area of the sheet in the desired predetermined relationship to one of the defined areas of the web substrate.

2. A laminator as recited in claim 1, wherein the registration means includes an angular adjustment means for turning the drum relative to the web substrate about a turning axis extending in a direction perpendicular to both the central axis of the drum and the path of travel of the web substrate to adjust the relative angular positions of the sheet and the web substrate so that the defined area of the sheet is in a desired predetermined angular relationship to one of the defined areas of the web substrate.

3. A laminator as recited in claim 1, wherein the drum includes an open interior and an outer circumferential surface on which each sheet is supported during registration, the outer surface including a plurality of holes in fluid communication with the open interior and the gripping means including a vacuum source connected with the open interior of the drum for drawing a vacuum through the openings to grip each sheet as the sheet is fed to the drum.

4. A laminator as recited in claim 3, further comprising a baffle supported within the open interior of the drum in a fixed orientation such that the baffle remains stationary during rotation of the drum, the baffle defining a first circumferential region within the open interior that is exposed to the vacuum and a second circumferential region that is shielded from exposure to the vacuum so that a vacuum is drawn through the openings of the outer surface of the drum only during rotation of the openings past the first circumferential region.

5. A laminator as recited in claim 1, further comprising support structure defining a pair of upstanding arms, and a pair of blocks supported on the arms for relative movement toward and away from the web substrate, the cylindrical drum being supported on the blocks, and the shifting means including at least one actuator connected to the blocks for shifting the blocks relative to the arms to shift the drum between the engaged and disengaged positions.

6. A laminator as recited in claim 5, wherein the drum includes a shaft that extends along the central axis through one of the blocks and the rotating means includes a motor connected to the shaft for rotating the drum, the motor being supported for movement with the blocks so that when the drum is shifted between the engaged and disengaged positions, the motor is operable to rotate the drum.

7. A laminator as recited in claim 6, wherein the registration means includes an angular adjustment means for turning the drum relative to the web substrate about a turning axis extending in a direction perpendicular to both the central axis of the drum and the path of travel of the web substrate to adjust the relative angular positions of the sheet and the web substrate so that each defined area of the sheet is in a desired predetermined angular relationship to one of the defined areas of the web substrate.

8. A laminator as recited in claim 7, wherein the support structure includes a frame presenting a pair of laterally spaced, stationary rails, each extending in a direction generally parallel to the path of travel of the web substrate, and a carriage supported for sliding movement on each rail, the arms being secured to the carriages so that relative movement of the carriages turns the drum relative to the web substrate about the turning axis, the angular adjustment means including at least one motor connected to the carriages for moving the carriages relative to one another along the rails.

9. A laminator as recited in claim 1, wherein the sheet feeding means includes a sheet forming station and a supply means for supplying a lamina web to the sheet forming station, the lamina web including defined, successive areas and indicia provided in predetermined positions relative to the defined areas, the sheet forming station including a sheeter mechanism for severing the lamina web into the sheets prior to feeding of the sheets onto the drum.

10. A laminator as recited in claim 9, wherein the sheet forming station includes a sensor disposed a fixed distance from the sheeter mechanism for sensing the presence of the indicia on the lamina web, and a control means for operating the sheeter mechanism once the presence of the indicia is sensed.

11. A laminator as recited in claim 1, wherein the registration means includes:

a first sensing means disposed a first fixed distance from the laminating position along the path of travel of the web substrate for sensing the presence of each indicium of the web substrate at the first fixed distance;

a second sensing means disposed a second fixed distance from the laminating position along the path of travel of the sheets for sensing the presence of the indicium of each sheet at the second fixed distance; and a control means for interrupting feed of the web substrate when the presence of one of the indicia of the web substrate is detected by the first sensing means, rotating the drum relative to the web substrate until one of the indicia of the sheet is detected by the second sensing means, and thereafter shifting the drum to the engaged position and advancing the web substrate and the sheet to the laminating position with each defined area of the sheet in the desired predetermined relationship to one of the defined areas of the web substrate.

12. A laminator as recited in claim 2, wherein the registration means includes:

a first sensing means disposed a first fixed distance from the laminating position along the path of travel of the web substrate for sensing the presence and proper angular orientation of each indicium of the web substrate at the first fixed distance;

a second sensing means disposed a second fixed distance from the laminating position along the path of travel of the sheets for sensing the presence and proper angular orientation of the indicium of each sheet at the second fixed distance; and a control means for interrupting feed of the web substrate when the presence of one of the indicia of the web substrate is detected by the first sensing means, rotating the drum relative to the web substrate until one of the indicia of the sheet is detected by the second sensing means, turning the drum about the turning axis until the proper angular orientation of the indicium on the sheet is sensed, and thereafter shifting the drum to the engaged position and advancing the web substrate and the sheet to the laminating position with each defined area of the sheet in the desired predetermined relationship to one of the defined areas of the web substrate.

13. A laminator as recited in claim 11, wherein the first and second sensing means include optical sensors that detect the presence or absence of an indicium at the fixed distances.

14. A laminator as recited in claim 11, wherein the first and second sensing means include cameras and focusing means for focusing the cameras on the web substrate and the sheets at the first and second fixed distances.

15. In a web-fed laminator for laminating a first web of material and sheet formed from a second web of material, wherein the first web and the sheets formed from the second web have defined, successive areas and at least one indicium provided in a predetermined position relative to each of the defined areas, and the laminator includes feeding means for feeding the webs of material through the laminator, a registration system for successively positioning each defined area of the sheet formed from the second web in a desired predetermined relationship to one of the defined areas of the first web as successive defined areas are brought into a laminating position, the registration system comprising:

a first sensing means disposed a first fixed distance from the laminating position along a path of travel of the first web for sensing the presence of each indicium of the first web at the first fixed distance;

a second sensing means disposed a second fixed distance from the laminating position along a path of travel of the second web adjacent said first path of travel of the first web for sensing the presence of each indicium of the second web at the second fixed distance;

a severing means for severing the material of the second web into said sheets, wherein each sheet bears at least one of the defined areas of the second web;

a cylindrical drum including a gripping means for gripping each sheet as the sheet is severed from the second web, the drum being shiftable toward and away from the first web between an engaged position in which the sheet carried on the drum is brought into contact with the first web, and a disengaged position in which the drum is moved away from the first web, the drum defining a central axis extending in a direction generally transverse to the path of travel of the first web;

a rotating means for rotating the drum;

a shifting means for shifting the drum between the engaged and disengaged positions, the shifting means shifting the drum to the engaged position when the sheet on the drum is registered with the first web and to the disengaged position after the sheet has been laminated to the first web, the rotating means rotating the drum in the engaged position to laminate the sheet on the second web at the laminating position; p1 a third sensing means disposed a third fixed distance from the laminating position along the path of travel of the sheets for sensing the presence of the indicium of each sheet at the third fixed distance; and a control means for interrupting feed of the first web when the presence of one of the indicia of the first web is detected by the first sensing means, interrupting feed of the second web and severing the material of the second web into sheets when the presence of one of the indicia of the second web is detected by the second sensing means, rotating the drum relative to the first web until one of the indicia of the sheet is detected by the third sensing means, and thereafter moving the drum to the engaged position and advancing the first web and the sheet to the laminating position with each defined area of the sheet in the desired predetermined relationship to one of the defined areas of the first web.

16. A registration system as recited in claim 15, wherein the first and third sensing means sense the proper angular orientation of the indicia of the first and second webs at the first and third fixed distances, the registration system further comprising an angular adjustment means for turning the drum relative to the first web about a turning axis extending in a direction perpendicular to both the central axis of the drum and the path of travel of the first web to adjust the relative angular positions of the sheet and the first web so that each defined area of the sheet is in a desired predetermined angular relationship to one of the defined areas of the first web, the control means controlling operation of the angular adjustment means to turn the drum about the turning axis until the proper angular orientation of the indicium on the sheet is sensed.

17. A registration system as recited in claim 15, wherein the first and second sensing means include optical sensors that detect the presence or absence of an indicium at the fixed distances.

18. In combination:

a web-fed laminator for laminating first and second webs of material, wherein the first web has defined, successive areas and a pair of indicia provided in a predetermined position relative to each of the defined areas, the laminator including a feeding means for feeding the first web along a path of travel presenting a first lamination position at which the two webs are brought together and a first registration position located a fixed distance from the lamination position;

a die press for punching defined, successive areas in the second web, the die press including a base platen, a ram platen shiftable toward and away from the base platen, a die unit received in the space between the base platen and the ram platen, a longitudinal shifting means for shifting the second web longitudinally through the die unit, and an angular shifting means for rotating the die unit relative to the base platen about a reference axis perpendicular to a plane containing the second web; and a registration system for positioning the die unit and the second web relative to one another as the indicia of successive defined areas of the first web are brought into the first registration position by the feeding means of the laminator, the registration system including:

a first pair of cameras for receiving images, a first focusing means for focusing the first cameras on the first registration position of the laminator, a reference means for providing reference image data representative of a home position of the indicia within each image received by the camera, comparison means for comparing the reference image data with an image received by the camera after movement of the first web has been interrupted with the indicia in the first registration position and for generating longitudinal and angular difference data representative of the difference in position between the area indicia within the image and the home position, and a control means for receiving the longitudinal and angular difference data and operating the longitudinal and angular shifting means to change the relative position between the second web and the die unit to compensate for the difference in position between the indicia within the image and the home position so that the defined area formed in the second web by operation of the die press will be in register with the corresponding defined area of the first web when the webs are brought together at the laminating position.

19. In combination:

a web-fed laminator for laminating first and second webs of material, wherein the first web has defined, successive areas and a pair of indicia provided in a predetermined position relative to each of the defined areas, the laminator including a feeding means for feeding the first web along a path of travel presenting a first lamination position at which the two webs are brought together and a first registration position located a fixed distance from the lamination position;

a die press for punching defined, successive areas in the second web, the die press including a base platen, a ram platen shiftable toward and away from the base platen, a die unit received in the space between the base platen and the ram platen, a longitudinal shifting means for shifting the second web longitudinally through the die unit, and an angular shifting means for rotating the die unit relative to the base platen about a reference axis perpendicular to a plane containing the second web; and a registration system for positioning the die unit and the second web relative to one another as the indicia of successive defined areas of the first web are brought into the first registration position by the feeding means of the laminator, the registration system including:

a first pair of cameras for receiving images, a first focusing means for focusing the first cameras on the first registration position of the laminator, a reference means for providing reference image data representative of a home position of the indicia within each image received by the camera, comparison means for comparing the reference image data with an image received by the camera after movement of the first web has been interrupted with the indicia in the first registration position and for generating longitudinal and angular difference data representative of the difference in position between the area indicia within the image and the home position, and a control means for receiving the longitudinal and angular difference data and operating the longitudinal and angular shifting means to change the relative position between the second web and the die unit to compensate for the difference in position between the indicia within the image and the home position so that the defined area formed in the second web by operation of the die press will be in register with the corresponding defined area of the first web when the webs are brought together at the laminating position;

said laminator being operable to bring the first and second webs together at the first laminating position to form a laminate, and said laminator includes a means for laminating a third web on the laminate at a second lamination position, the third web having defined, successive areas and a pair of indicia provided in a predetermined position relative thereto, the feeding means feeding the laminate along a path of travel toward the second lamination post, the path of travel defining a second registration position located a fixed distance from the second lamination position, the means for laminating the third web on the laminate including a feeding means for feeding the third web along a second travel path defining a third registration position located a fixed distance from the second lamination position;

the registration system further including:

a severing means for severing the material of the third web into sheets, wherein each sheet bears at least one of the defined areas of the third web, a cylindrical drum including a gripping means for gripping each sheet as the sheet is severed from the third web, the drum being shiftable toward and away from the laminate between an engaged position in which the sheet carried on the drum is brought into contact with the laminate, and a disengaged position in which the drum is removed from contact with the laminate, the drum defining a central axis extending in a direction generally transverse to the path of travel of the laminate, a rotating means for rotating the drum, a shifting means for shifting the drum between the engaged and disengaged positions, the shifting means shifting the drum to the engaged position when the sheet on the drum is registered with the first web and to the disengaged position after the sheet has been laminated on the first web, the rotating means rotating the drum in the engaged position to laminate the sheet on the second web at the laminating position, second and third pairs of cameras for receiving images, a second focusing means for focusing the second cameras on the second registration position of the laminator, a third focusing means for focusing the third cameras on the third registration position of the laminator, a second sensing means disposed a second fixed distance from the laminating position along the path of travel of the second web for sensing the presence of each indicium of the second web at the second fixed distance, a second comparison means for comparing the images received by the second cameras with the images received by the third cameras after movement of the laminate and third web have been interrupted with the indicia of the first web in the second registration position and the indicia of the third web in the third registration position for generating longitudinal and angular difference data representative of the difference in position between the area indicia within the images of the third cameras and the area indicia within the images of the second cameras, and the control means receiving the longitudinal and angular difference data from the second comparison means and operating the rotating means and the turning means to change the relative position between the third web and the laminate to compensate for the difference in position between the indicia within the images of the third cameras and the indicia within the images of the second cameras so that each defined area on the third web is registered with the corresponding defined area of the laminate when brought together at the second laminating position.

20. In combination:

a web-fed laminator for laminating first and second webs of material, wherein the first web has defined, successive areas and a pair of indicia provided in a predetermined position relative to each of the defined areas, the laminator including a feeding means for feeding the first web along a path of travel presenting a first lamination position at which the two webs are brought together and a first registration position located a fixed distance from the lamination position;

a die press for punching defined, successive areas in the second web, the die press including a base platen, a ram platen shiftable toward and away from the base platen, a die unit received in the space between the base platen and the ram platen, a longitudinal shifting means for shifting the second web longitudinally through the die unit, and an angular shifting means for rotating the die unit relative to the base platen about a reference axis perpendicular to a plane containing the second web; and a registration system for positioning the die unit and the second web relative to one another as the indicia of successive defined areas of the first web are brought into the first registration position by the feeding means of the laminator, the registration system including:

a first pair of cameras for receiving images, a first focusing means for focusing the first cameras on the first registration position of the laminator, a reference means for providing reference image data representative of a home position of the indicia within each image received by the camera, comparison means for comparing the reference image data with an image received by the camera after movement of the first web has been interrupted with the indicia in the first registration position and for generating longitudinal and angular difference data representative of the difference in position between the area indicia within the image and the home position, and a control means for receiving the longitudinal and angular difference data and operating the longitudinal and angular shifting means to change the relative position between the second web and the die unit to compensate for the difference in position between the indicia within the image and the home position so that the defined area formed in the second web by operation of the die press will be in register with the corresponding defined area of the first web when the webs are brought together at the laminating position;

said registration system further including an intermittently operable severing means for severing said second web into one or more sheets;

means controlling operation of the severing means and connected to said registration means for effecting operation of the means when the comparison means indicate that there is a predetermined mismatch between the indicia associated with a defined area of said first web with the indicia associated with a corresponding defined area of the second web; and means controlled by said registration means for shifting each of the severed sheets into disposition aligning the defined area thereon with the corresponding defined area of the second web prior to lamination of the severed sheet of the first web.

* * * * *